United States Patent
Mann

(10) Patent No.: US 10,220,539 B2
(45) Date of Patent: Mar. 5, 2019

(54) SAW BLADE FOR AN OSCILLATINGLY DRIVEN SAW

(71) Applicant: C. & E. Fein GmbH, Schwaebisch Gmuend-Bargau (DE)

(72) Inventor: Rainer Mann, Aalen-Dewangen (DE)

(73) Assignee: C. & E. Fein GmbH, Schwaebish Gmuend-Bargau (DE)

( * ) Notice: Subject to any disclaimer, the term of this patent is extended or adjusted under 35 U.S.C. 154(b) by 53 days.

(21) Appl. No.: 14/542,164

(22) Filed: Nov. 14, 2014

(65) Prior Publication Data

US 2015/0135915 A1 May 21, 2015

(30) Foreign Application Priority Data

Nov. 15, 2013 (DE) .......... 10 2013 112 632

(51) Int. Cl.
*B27B 19/00* (2006.01)
*B23D 61/00* (2006.01)
*B23D 61/18* (2006.01)
*B24D 5/12* (2006.01)

(52) U.S. Cl.
CPC .......... *B27B 19/006* (2013.01); *B23D 61/006* (2013.01); *B23D 61/18* (2013.01); *B24D 5/123* (2013.01); *Y10T 83/04* (2015.04); *Y10T 83/9319* (2015.04)

(58) Field of Classification Search
CPC ... B23D 61/18; B23D 61/006; Y10T 83/9319; B24B 23/04; B27B 19/006
USPC .............. 125/15, 19; 451/541–547; 606/178; 83/835, 769, 782, 491; D08/20
See application file for complete search history.

(56) References Cited

U.S. PATENT DOCUMENTS

| | | | | |
|---|---|---|---|---|
| 2,490,173 A | * | 12/1949 | Swahnberg | .......... A01D 34/475 56/254 |
| 2,751,680 A | * | 6/1956 | Wezel | .......... A22B 5/163 30/219 |
| 2,766,524 A | * | 10/1956 | Dagneau | .......... A22B 5/163 30/215 |
| 5,018,276 A | * | 5/1991 | Asada | .......... B23D 65/00 30/347 |
| 5,142,853 A | * | 9/1992 | Routery | .......... A01D 34/412 56/242 |
| 5,544,643 A | | 8/1996 | Bauer et al. | |
| 5,697,835 A | * | 12/1997 | Nitz | .......... B23D 61/006 125/15 |

(Continued)

FOREIGN PATENT DOCUMENTS

DE    3940743 A1    6/1991
DE    3448276 C2    7/1991

(Continued)

OTHER PUBLICATIONS

DE102011103880 English Translation; Nov. 2012; Norbert Lay.*

(Continued)

*Primary Examiner* — Laura M Lee

(74) *Attorney, Agent, or Firm* — Muncy, Geissler, Olds & Lowe, P.C.

(57) ABSTRACT

A saw blade for a machine tool driven oscillatingly about a longitudinal axis has at least one cutting edge, on which, at least in part, abrasive particles are provided. The saw blade is suitable, in particular, for sawing fiber composites.

10 Claims, 4 Drawing Sheets

(56) References Cited

U.S. PATENT DOCUMENTS

| | | | | |
|---|---|---|---|---|
| 5,989,116 | A * | 11/1999 | Johnson | B26D 1/0006 452/150 |
| 2002/0104421 | A1 * | 8/2002 | Wurst | B23D 61/006 83/835 |
| 2004/0044103 | A1 * | 3/2004 | Rooshenas | C04B 16/0691 524/2 |
| 2005/0081697 | A1 * | 4/2005 | Liao | B24D 5/123 83/835 |
| 2005/0178261 | A1 | 8/2005 | Thomaschewski | |
| 2008/0171505 | A1 * | 7/2008 | Kim | B23D 61/18 451/548 |
| 2013/0160631 | A1 * | 6/2013 | Nagy | B23D 61/006 83/848 |
| 2013/0331013 | A1 * | 12/2013 | Neal, Jr. | B23D 61/006 451/461 |
| 2015/0020671 | A1 | 1/2015 | Meindorfer | |

FOREIGN PATENT DOCUMENTS

| | | | | |
|---|---|---|---|---|
| DE | 4322544 | C1 | 3/1995 | |
| DE | 202004007929 | U1 | 7/2004 | |
| DE | 202007018441 | U1 | 7/2008 | |
| DE | 202009008427 | U1 | 11/2010 | |
| DE | 202011108736 | U1 | 4/2012 | |
| DE | 102011103880 | A1 * | 11/2012 | B23D 61/006 |
| DE | 102011103880 | A1 | 11/2012 | |
| DE | 102012201667 | A1 | 8/2013 | |
| EP | 0886552 | A1 | 12/1998 | |
| EP | 1193738 | A2 | 4/2002 | |
| EP | 1481750 | A1 | 12/2004 | |
| EP | 1859884 | A1 * | 11/2007 | B23D 61/006 |
| GB | 2075878 | A | 11/1981 | |
| GB | 2168001 | A | 6/1986 | |
| WO | 9733714 | A1 | 9/1997 | |
| WO | 2012059287 | A1 | 5/2012 | |

OTHER PUBLICATIONS https://www.homedepot.com/p/Dremel-Multi-Max-Bi-Metal-Saw-Oscillating-Tool-Blade-for-Wood-Drywall-and-Metal-MM452/203077212. Dremel blade.* https://www.homedepot.com/p/Dremel-Multi-Max-Bi-Metal-Saw-Oscillating-Tool-Blade-for-Wood-Drywall-and-Metal-MM452/203077212. Question and Answer.*

* cited by examiner

SAW BLADE FOR AN OSCILLATINGLY DRIVEN SAW

CROSS REFERENCES TO RELATED APPLICATIONS

This application claims priority from German patent application 102013112 632.4, filed on Nov. 15, 2013. The entire contents of this priority application is incorporated herein by reference.

BACKGROUND OF THE INVENTION

For the hand-guided machining of fiber composites, rapidly rotating, diamond-coated tools are used, in particular diamond-coating cutting or grinding tools.

The strong dust formation, which, due to the rapid rotary motion, leads to a strong raising of dust, can here be regarded as disadvantageous. The machining of fiber composites therefore requires a complex dust extraction system, which, in hand-guided machining, can often barely be realized or only with difficulty. Moreover, temperatures in the order of magnitude of around 60° C. are generated at the cut surface on the workpiece or on the tool.

SUMMARY OF THE INVENTION

In view of this, the object of the invention is to disclose an option for sawing fiber composites whereby the dust accumulation in the course of the machining can be significantly reduced and, at the same time, a good work result is obtainable.

According to one aspect of the invention there is disclosed a saw blade for sawing fiber composites, said saw blade comprising a mounting part being configured for attaching on a tool spindle of a machine tool being driven oscillatingly about a longitudinal axis thereof, said saw blade having at least one cutting edge, comprising a plurality of teeth having at least one surface comprising a metal coating wherein abrasive particles are embedded.

According to another aspect of the invention there is disclosed a machine tool for sawing fiber composites, comprising an oscillatory drive having a tool spindle which can be driven oscillatingly about a longitudinal axis thereof, wherein a saw blade is releasably attached to said tool spindle, said saw blade comprising at least one cutting edge, on which, at least in part, abrasive particles are provided.

According to a further aspect of the invention there is disclosed a method of sawing a workpiece made of a fiber composite, comprising the following steps:
 providing a machine tool comprising an oscillatory drive having a tool spindle which can be driven oscillatingly about a longitudinal axis thereof;
 attaching a saw blade to said tool spindle, said saw blade comprising at least one cutting edge comprising teeth, whereon, at least in part, abrasive particles are provided;
 oscillating said oscillatory drive; and
 cutting said workpiece by guiding said oscillating saw blade through said workpiece.

According to the invention, in place of rotatingly driven diamond-coated tools, use is made of a saw blade, which is used in conjunction with a machine tool driven oscillatingly about a longitudinal axis and in which the at least one cutting edge is coated at least partially with abrasive particles.

It has been shown that, in the case of fiber composites, traditional rotationally driven sawing tools lead to strong warming and, at the same time, to the gumming of the relatively pliable material. If, according to the invention, in place of a rotating drive motion, an oscillatingly driven machine tool is used in conjunction with a saw blade, on which machine tool is jointly provided at least one cutting edge, which is provided at least in part with abrasive particles, then, on the one hand, the problem of warming is avoided and, on the other hand, through the use of abrasive particles, a good cutting performance and good chip removal is enabled. At the same time, the problem of gumming is avoided.

All in all, it has surprisingly been shown that, with an oscillatingly driven saw blade, whose at least one cutting edge is at least partially provided with abrasive particles, very good sawing results, combined with low dust accumulation and low warming, can be obtained.

Oscillatingly driven saw blades which are provided with abrasive particles are fundamentally known, in fact, in the prior art. Thus DE 43 22 544 C1, for instance, discloses an elongate saw blade, which is provided with abrasive particles and which, in the case of a hacksaw, is used to saw ductile iron materials.

However, the invention is not hereby suggested, since the saw blade in question is designed only for a hacksaw which oscillates back and forth in the longitudinal direction and is intended for sawing ductile iron materials.

The abrasive particles can advantageously consist of diamond, hard metal or boron nitrite.

It has surprisingly been shown that abrasive particles of hard metal are well suited to producing a good cutting performance combined with low dust accumulation. Abrasive particles of yet greater hardness, i.e. of boron nitrite or diamond, are also particularly well suited.

According to a further embodiment of the invention, the abrasive particles are held in a metal coating on a surface of the saw blade.

By virtue of a metal coating, a durable and highly effective fixing of the abrasive particles on a surface of the saw blade can be ensured.

According to a further embodiment of the invention, the abrasive particles consist of diamond or boron nitrite, and the metal coating consists of a nickel alloy which is preferably galvanically separated.

This measure has the advantage that a metal coating of this type possesses a particular toughness and hardness and at the same time ensures a secure fixing of the abrasive particles.

According to a further embodiment of the invention, the abrasive particles consist of hard metal, and the metal coating consists of a soldering alloy, preferably of a copper-based alloy.

This measure has the advantage that, with a metal coating of this type, a particularly secure fixing of the hard-metal abrasive particles on the surface of the saw blade can be obtained. Moreover, a simple manufacture is obtained, in that the abrasive particles are firstly applied with a soldering paste to the surface to be coated, and then the soldering paste can be melted by heating in an oven and securely connected to the saw blade, the abrasive particles protruding in a raised manner.

The abrasive particles preferably have an average particle size of 0.05 to 1 mm, preferably of 0.1 to 0.7 mm, further preferably of 0.1 to 0.5 mm.

It has been shown that, particularly in the case of hard metal particles, particles sizes ranging from 0.1 to 0.3 mm are particularly suitable and, in diamond or boron nitrite particles, average particle sizes of around 0.3 to 0.4 mm are particularly suitable.

In an advantageous refinement of the invention, the cutting edge has teeth, which are at least partially provided with abrasive particles.

In this case, abrasive particles are preferably provided at least on the tooth tips.

According to a further advantageous embodiment of the invention, the teeth are provided with abrasive particle also in the region of gullets between the individual teeth.

In addition, it is preferred that the abrasive particles are arranged at least partially also on side faces of the saw blade.

With these measures, a particularly good cutting performance in the sawing of fiber composites can be ensured.

Preferably, the teeth have tooth tips, which are separated from one another by gullets.

The teeth here extend preferably along a pitch circle which runs concentrically to a mounting hole for the fastening of the saw blade to a tool spindle of an oscillatory drive.

This results in very smooth running of the saw blade during the sawing operation and avoids local overloads of the workpiece.

In addition, the teeth can extend preferably along at least one straight line, which runs tangentially to a pitch circle running concentrically to the mounting hole.

With an embodiment of this type, an improved forward feed and a more aggressive action of the saw blade on the workpiece is obtained.

In addition, the teeth preferably have tip surfaces, which extend preferably along a pitch circle running concentrically to the mounting hole or along at least one straight line which runs tangentially to a pitch circle running concentrically to the mounting hole.

This, too, contributes either to a low-vibration sawing operation or to a more aggressive action in the sawing operation.

The saw blade in question can here be configured, in particular, as a circular or partially circular saw blade, or else as an elongate saw blade, at whose one end a cutting edge is provided and at whose other end the mounting hole is provided for connection to the tool spindle of the oscillatory drive.

By virtue of the gullets between the individual tooth tips, an adequate chip removal is ensured.

Numerous embodiments of the teeth are conceivable, in particular an embodiment as rectangular teeth, as trapezoidal teeth, as negative trapezoidal teeth, as M-shaped teeth, as rectangular teeth without base radius, as round teeth, as angled teeth, or as flat and round teeth.

With all these embodiments, good cutting performances can be obtained in combination with a relatively low dust accumulation. Advantageously, the teeth are not, however, provided with wedge angles, i.e. are not designed as traditional saw teeth in which, starting from a tooth crest, a tooth back extends in a wedge shape in the direction of the tooth base.

Instead, the tip surfaces of the teeth advantageously extend, as mentioned above, along a pitch circle concentric to the mounting hole, or along at least one straight line which runs tangentially to a pitch circle concentric to the mounting hole. This produces an approximately constant distance of the tip surface from the workpiece surface during the sawing operation, which distance slightly changes only in the case of a straight design.

The thickness of the saw blade is in the uncoated region preferably no more than 1.5 mm, further preferably no more than 1 mm, particularly preferably 0.4 to 1 mm. In the coated region, the thickness of the saw blade is preferably 1 to 2.5 mm, preferably around 1.2 millimeters in respect of fine graining, and around 2.2 millimeters in respect of coarse graining.

It has been shown that, with such a slender saw blade, it is possible to obtain a particularly good cutting performance in respect of fiber composites.

As already mentioned above, an above-described saw blade can particularly advantageously be used to saw fiber composites, in particular to saw carbon fiber plastics, glass-fiber reinforced plastics, or generally composite materials consisting, in particular, of plastic in combination with a second material, e.g. aluminium.

A machine tool according to the invention for sawing fiber composites has an oscillatory drive that has a tool spindle which can be driven oscillatingly about its longitudinal axis and to which a saw blade according to the above-described type can be secured.

In a further preferred embodiment of the invention, the saw blade has a toothing having a tooth spacing T which is less than the double the oscillation angle $\alpha$ of the oscillatory drive: $T<2\alpha$.

In addition, the saw blade preferably has a toothing having a tooth spacing T which is greater than the oscillation angle $\alpha$ of the oscillatory drive: $T>\alpha$.

With such a dimensioning of the tooth spacing, it is ensured that at least always one tooth is engaged while the saw blade oscillates back and forth. By the oscillation angle $\alpha$ is here understood the angle at which the drive shaft oscillates from turning point to turning point.

According to a further embodiment of the invention, the tooth tips extend in the peripheral direction respectively over an angular range of Z and the gullets over an angular range of L, wherein the ratio of Z/L is greater than 1, lies preferably within the range of $4L>Z>L$.

With a dimensioning of this type, a good stability and, at the same time, good dust removal is obtained.

Of course, the features of the invention which have been stated above and those which have yet to be explained below can be used not only in the respectively defined combination, but also in other combinations or in isolation without departing from the scope of the invention.

BRIEF DESCRIPTION OF THE DRAWINGS

Further features and advantages of the invention emerge from the following description of preferred illustrative embodiments with reference to the drawing, wherein.

DESCRIPTION OF PREFERRED EMBODIMENTS

Figure 1:
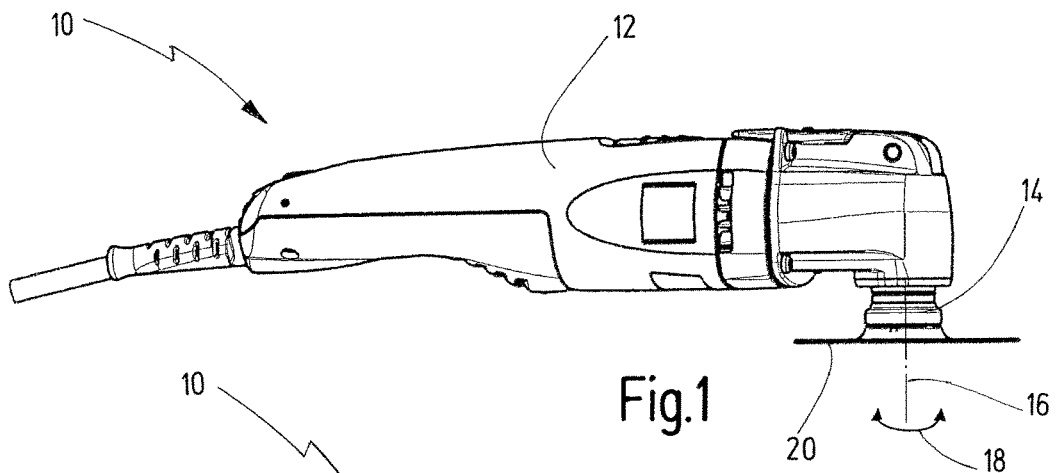
FIG. 1 shows a machine tool according to the invention, in side view.
Figure 2:
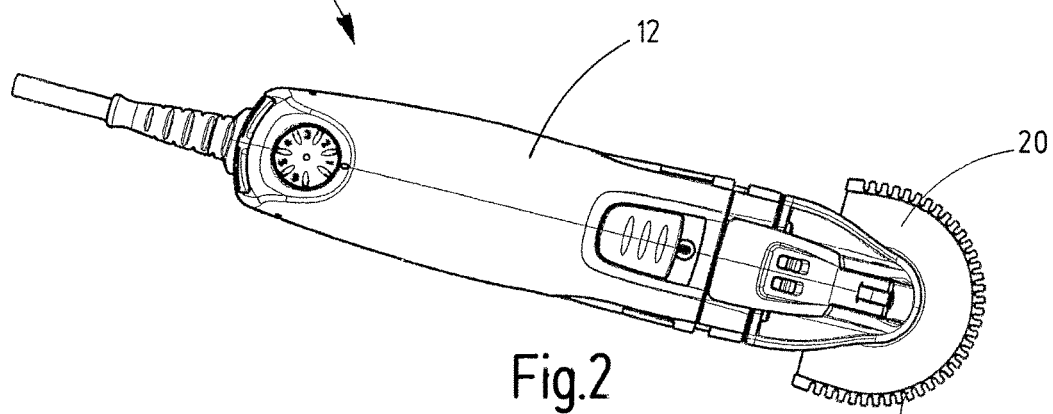
FIG. 2 shows the machine tool according to FIG. 1, in a view from above.

In FIGS. 1 and 2, a machine tool according to the invention is represented and is denoted in its entirety by the numeral 10.

The machine tool 10 comprises an oscillatory drive 12 of fundamentally known construction having a tool spindle 14 which is driven about its longitudinal axis 16 at high frequency (about 10,000 to 20,000 oscillations per minute) and at low pivot angle. The pivot angle or oscillation angle α can range from around 1° to 5° and in the present case is 3.2° (from turning point to turning point).

To the outer end of the tool spindle 14 is fastened a tool according to the invention in the form of a saw blade 20. The saw blade 20 has a partially circular cutting edge 22, which, as is described in greater detail below, is coated with abrasive particles.

Figures 3, 4, 5:
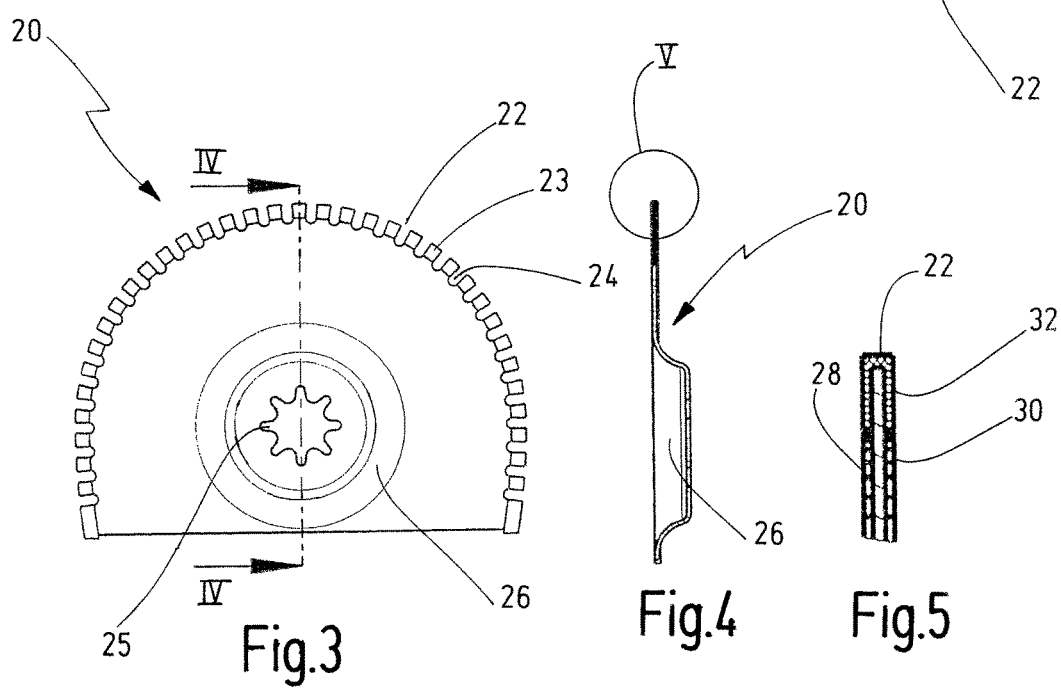
FIG. 3 shows an enlarged representation of a saw blade according to the invention according to FIG. 2, from above.
FIG. 4 shows a section through the saw blade according to FIG. 3 along the line IV-IV.
FIG. 5 shows an enlarged partial section through the detail V according to FIG. 4.

FIG. 3 shows an enlarged top view of the saw blade 20 according to FIG. 2.

For the fastening of the saw blade 20 to the outer end of the tool spindle 14, a mounting hole 25 is provided in the region of an offset 26. The mounting hole 25 is tailored to the associated shape of the tool spindle 14, so that a positive-locking securement to the tool spindle 14 is enabled. By virtue of the offset 26 (cf. FIG. 4), the fastening to the tool spindle 14 can be realized flush, so that it is possible to work directly along a workpiece surface with the saw blade 20.

The cutting edge 22 has a succession of saw teeth 23, which are respectively separated from one another by a gullet 24 with round base. The teeth 23 extend along a pitch circle concentric to the mounting hole 25 or a pitch circle concentric to a centre axis through the mounting hole 25 and are of rectangular configuration.

According to the invention, the teeth 23 are provided only in the region of their respective tooth tip, on all sides, with abrasive particles, which are fixed in a metal coating 32. In the embodiment according to FIG. 3, the metal coating 32 extends only over the region of the tooth tips, but not up to the base of the gullets 24.

Figure 6:
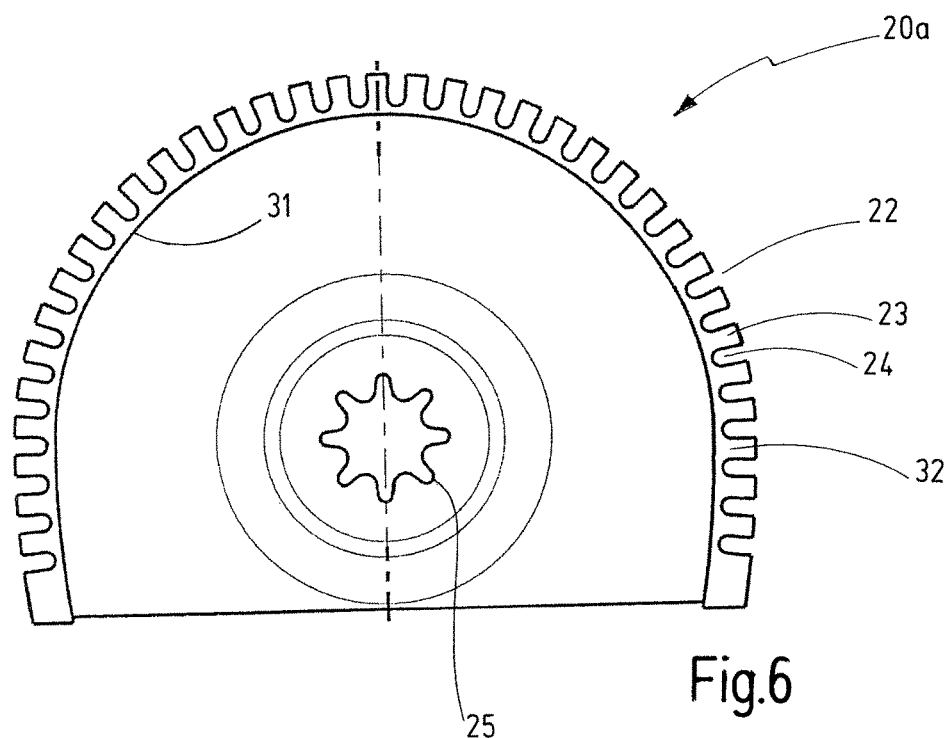
FIG. 6 shows an enlarged representation of a saw blade which is slightly modified from the embodiment according to FIG. 3.

FIG. 6 shows a slightly modified embodiment, wherein the metal coating 32 containing abrasive particles, starting from the tooth tips 32, extends to beyond the region of the base of the gullets 24 up to a line 31 indicating the boundary of the metal coating 32.

Figure 7:
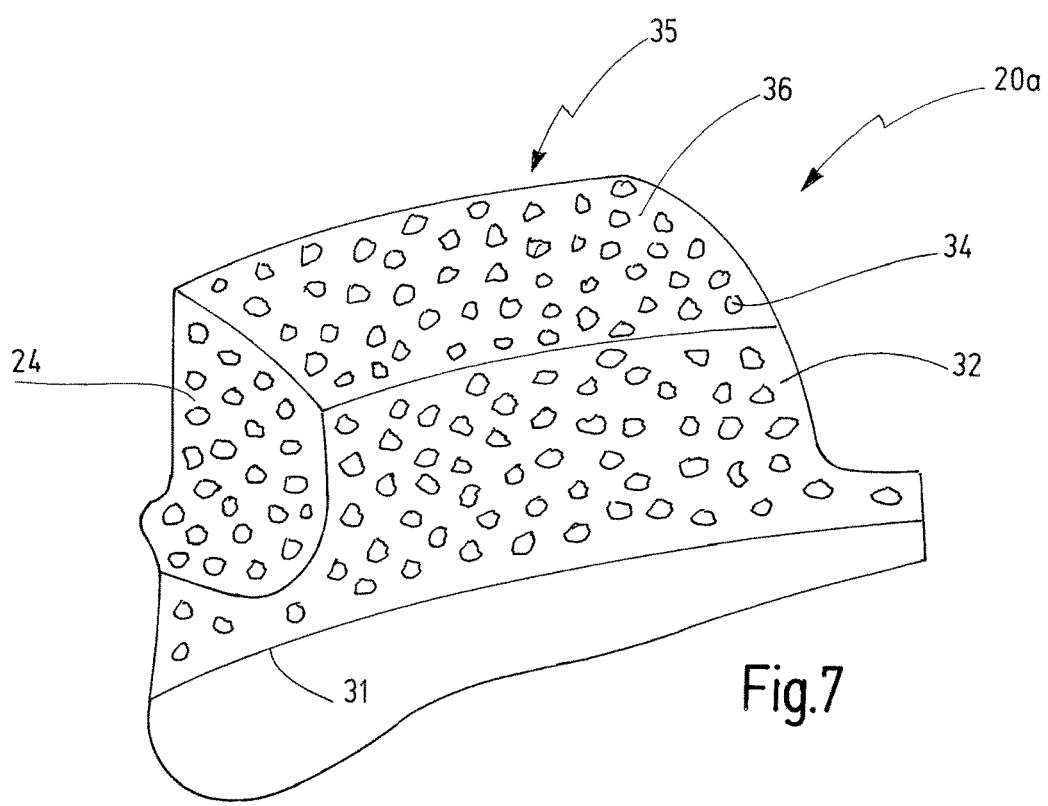
FIG. 7 shows an enlarged perspective partial view of a tooth tip of the saw blade according to FIG. 6.

FIG. 7 shows an enlarged representation of a tooth tip 35 of the saw blade 20a in perspective representation, from which the metal coating 32 containing abrasive particles 34 can be better seen.

Of course, the representation according to FIG. 7 is merely of a purely schematic nature and does not have to reproduce the actual size relationships.

In the represented case, the entire tooth tip 35 is provided, both in the region of its partially circular or partially cylindrical tip surface 36, and in the region of its gullets 24, and also in the region of the front and rear side face, with the metal coating 32, in which abrasive particles 34 are enclosed. The abrasive particles 34 protrude in a raised manner from the metal coating 32. The metal coating 32 extends beyond the region of the gullets 24 further inwards up to the boundary 31 according to FIG. 6.

The abrasive particles 34 preferably consist of diamond, boron nitrite or hard metal and are bound in the metal coating 32.

Where the abrasive particles 34 consist of diamond or boron nitrite, then the metal coating 32 consists of a nickel alloy, which advantageously can be galvanically separated.

Where the abrasive particles 34 consist of hard metal, these are preferably bound in a metal coating 32 consisting of a soldering alloy, preferably a copper-based alloy.

Whilst the nickel alloy can advantageously be separated galvanically, or otherwise cathodically, anodically or using a wet chemical method, the formation of the metal coating 32 from a soldering alloy allows the abrasive particles 34 to be applied, together with a soldering paste, to the surfaces to be coated and then allows the soldering paste to be melted by heating in an oven so as thus to achieve a secure connection to the surface of the saw blade and a secure fixing of the abrasive particles 34.

It has been shown that, in the case of diamond particles or boron nitrite particles, average particle sizes of around 0.3 to 0.4 mm are optimal. If the abrasive particles, by contrast, consist of hard metal, then particle sizes of around 0.1 to 0.3 mm have proved particularly advantageous.

Figure 8:
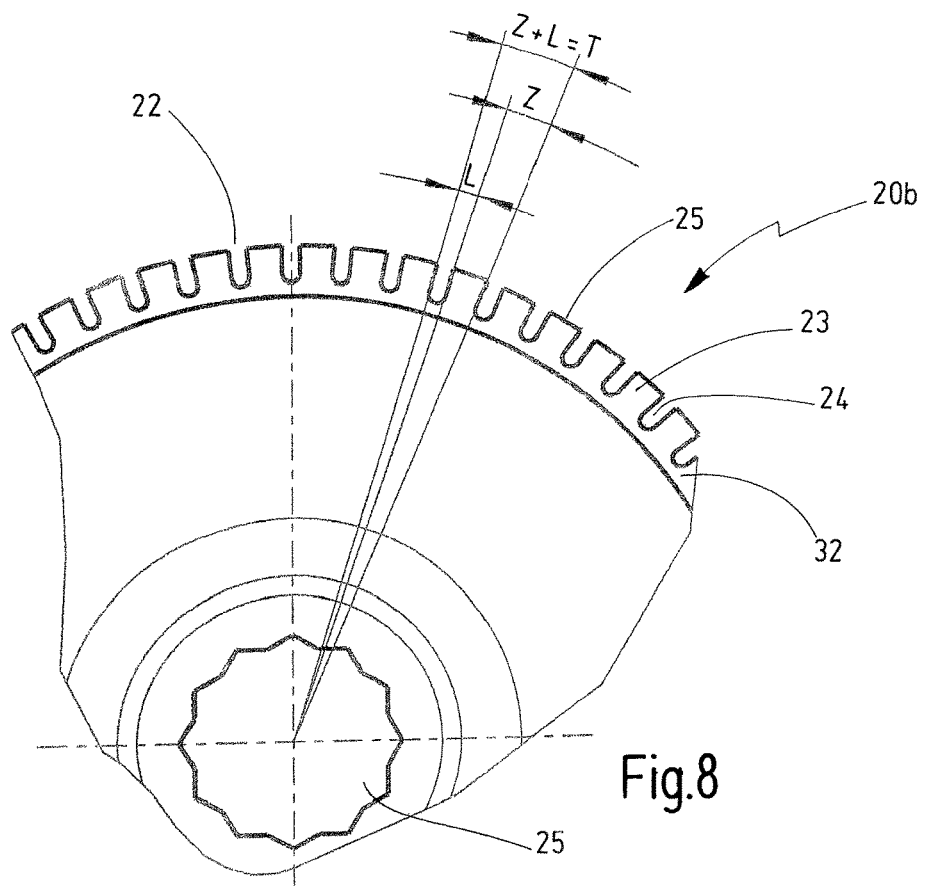
FIG. 8 shows an enlarged perspective partial view of a further embodiment of a saw blade according to the invention, from which the angular relationships can be clearly seen.

In FIG. 8, the geometrical relationships between the tooth spacing and the size of the teeth and the gullets are represented.

The angle over which a tooth 23 extends shall here be denoted by Z. Adjacent teeth 23 are respectively separated from one another by a gullet 24. The angular range over which a gullet 24 extends shall here be denoted by L. The tooth spacing T is thus obtained as the sum of Z and L: T=Z+L. Preferably, the ratio of Z/L is here greater than 1 and lies preferably within the range of 4L>Z>L. In the represented case according to FIG. 8, Z is roughly equal to 2L.

If the oscillation angle α is defined as the angle through which the tool spindle 14 moves from turning point to turning point, then the tooth spacing T lies preferably between one and two times the oscillation angle. If the oscillation angle α is thus, as in the present case, 3.2°, then the tooth spacing T should preferably lie between 3.2° and 6.4°.

With such a dimensioning it is ensured that, during the sawing operation, at least always one tooth is engaged. At the same time, an adequate stability and an adequate chip removal are ensured.

Figure 9:
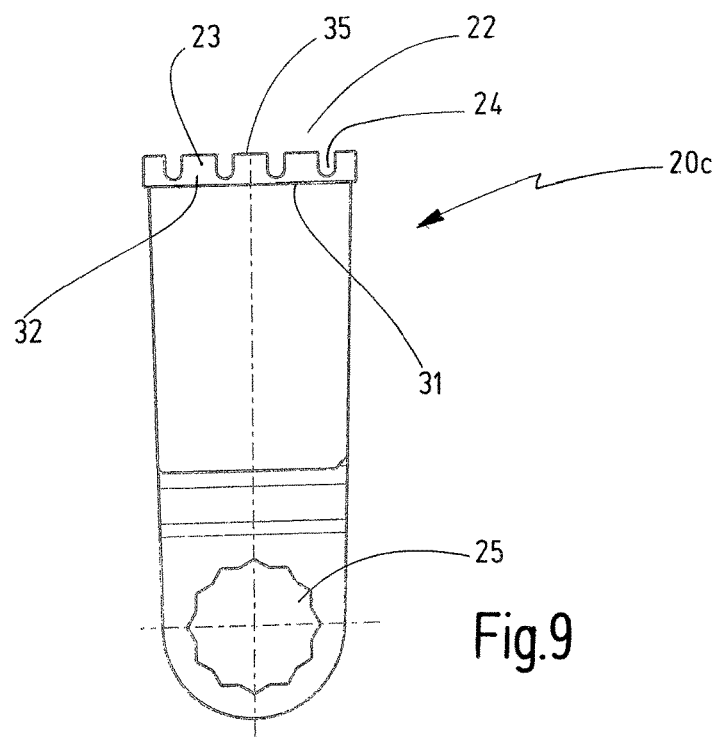
FIG. 9 shows a view of a further embodiment of a saw blade according to the invention.

FIG. 9 shows a modified embodiment of a saw blade, which is denoted in its entirety by 20c. The basic difference from the saw blade according to FIG. 8 consists in the fact that it is a case of an elongated saw blade in place of a partially circular saw blade. This means that the mounting hole 25, which is here of polygonal configuration, is located at one end of the saw blade 20c, whilst at the opposite end is disposed the cutting edge 22 comprising the teeth 23 and the intervening gullets 24.

The teeth 23 have tooth tips 35, which extend with their tip surfaces along a straight line or a plane which runs tangentially to a pitch circle around the mounting hole 25 or around a centre axis through the mounting hole 25. The cutting edge 22 is once again provided in the region of its teeth 23, on all sides, with the coating 32 containing abrasive particles 34. The coating 32 here extends beyond the region of the gullets 24 up to the boundary 31.

In FIGS. 10 to 17 are represented a number of different tooth shapes which are suitable for sawing fiber composites.

These figures respectively feature a partial view of a partially circular saw blade in the region of the cutting edge.

Figure 12:
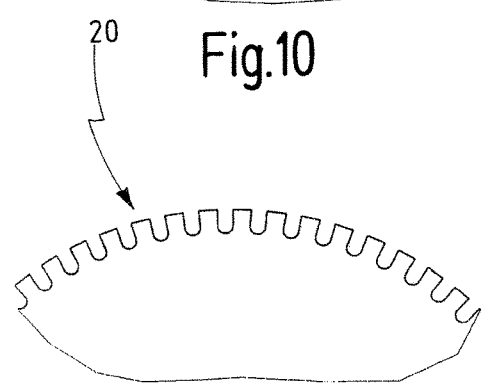

The saw blade 20 according to FIG. 12 corresponds to the embodiment previously described with reference to FIG. 6.

Figure 10:
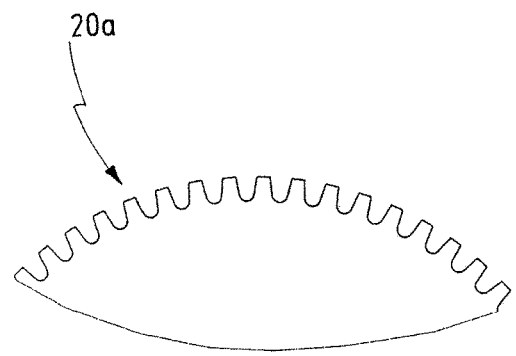
FIGS. 10 to 17 show partial views of partially circular saw blades having different tooth shapes.

The saw blade 20a according to FIG. 10 shows trapezoidal teeth with round gullets.

Figure 11:
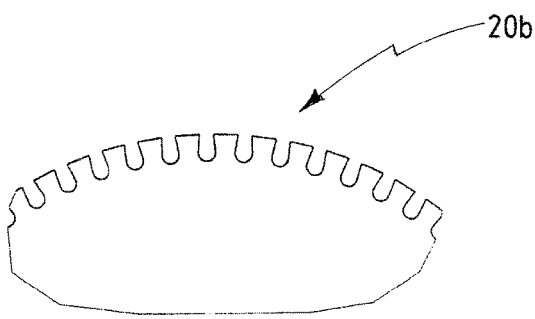

The saw blade 20b according to FIG. 11 shows teeth with negative trapezoidal shape and round gullets.

Figure 13:
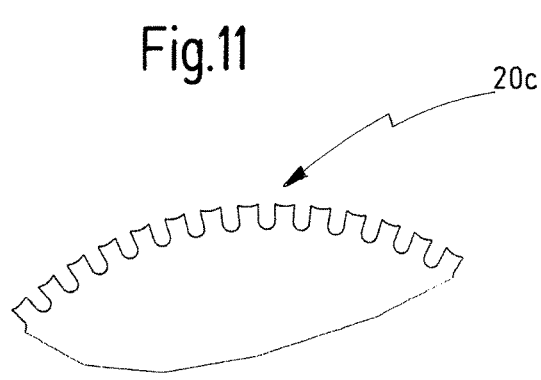

The saw blade 20c according to FIG. 13 shows M-shaped teeth, in which the tip surfaces 36 extend in an outwardly concave curvature, respectively with rounded gullets between the individual teeth.

Figure 14:
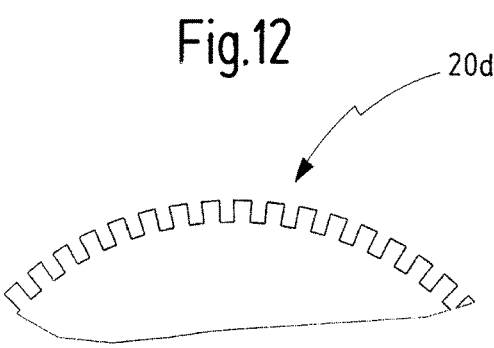

The saw blade 20d according to FIG. 14 has rectangular teeth with likewise rectangular gullets.

Figure 15:
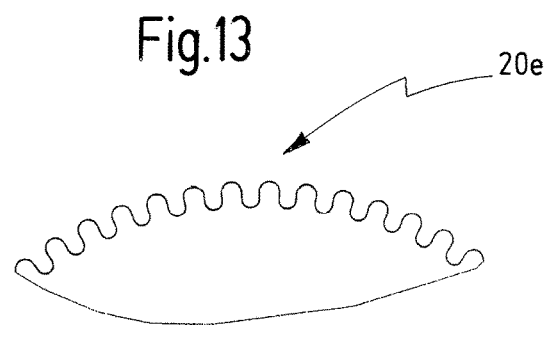

The saw blade 20e according to FIG. 15 has round teeth with rounded gullets.

Figure 16:
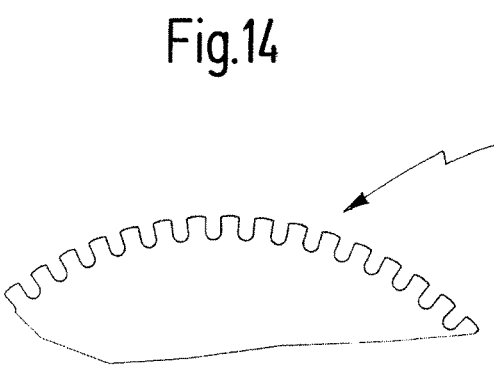

The saw blade 20f according to FIG. 16 has flat and round teeth, in which the outwardly pointing roundings of the individual teeth are flattened off compared to the embodiment of the saw blade 20e according to FIG. 15.

Figure 17:
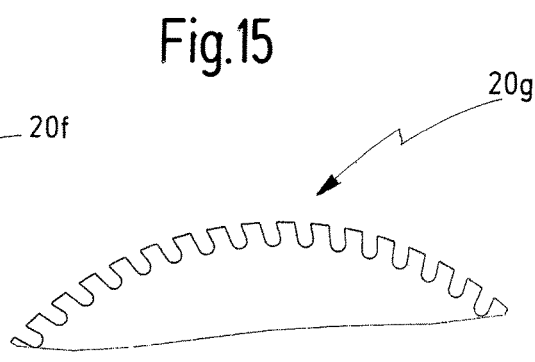

The saw blade 20g according to FIG. 17 has angled teeth with rounded gullets.

Of course, the above-described tooth shapes according to FIGS. 10 to 17 are not exhaustive in nature, but rather other tooth shapes are also, in principle, conceivable.

It is advantageous, however, if the individual teeth, in the case of a partially circular saw blade, extend along a pitch circle concentric to the mounting hole or, where a saw blade according to FIG. 9 is used, that the teeth extend along a straight line running tangentially to a pitch circle concentric to the mounting hole.

The invention claimed is:

1. A machine tool for sawing fiber composites, said machine tool comprising an oscillatory drive having a tool spindle that is driven oscillatingly about a longitudinal axis thereof, wherein a saw blade is releasably attached to said tool spindle, said saw blade comprising at least one cutting edge, on at least a part of which, abrasive particles are provided for sawing the fiber composites, said saw blade comprising a mounting part being configured for attaching on the tool spindle, said at least one cutting edge comprising a plurality of teeth having at least one surface comprising a metal coating in which the abrasive particles are embedded, said plurality of teeth having tooth tips, which define the at least one cutting edge and which are separated from one another by gullets, said plurality of teeth also having tooth bases that extend from the mounting part, wherein the plurality of teeth are connected to one another only at their respective tooth bases, wherein said oscillatory drive has a certain oscillation angle, wherein said saw blade has a toothing having an angular tooth spacing which is less than double said oscillation angle of said oscillatory drive, wherein said angular tooth spacing is greater than said oscillation angle of said oscillatory drive, and wherein the plurality of tooth tips lie in a common plane, wherein said mounting part comprises a mounting hole for attaching said saw blade to said tool spindle, and wherein said teeth are arranged along a pitch circle extending concentrically to said mounting hole, and wherein each tooth tip extends along said pitch circle over an angular range of Z and each said gullet extends over an angular range of L, wherein a ratio of Z divided by L is greater than 1.

2. The machine tool of claim 1, wherein said abrasive particles are selected from the group consisting of diamond, hard metal and boron nitrite.

3. The machine tool of claim 2, wherein said metal coating is selected from the group formed by a soldering alloy and a nickel alloy.

4. The machine tool of claim 3, wherein said metal coating is a copper-based soldering alloy and wherein said abrasive particles are hard metal particles.

5. The machine tool of claim 2, wherein said abrasive particles are selected from the group consisting of diamond and boron nitrite, and wherein said metal coating consists of a nickel alloy.

6. The machine tool of claim 1, wherein said abrasive particles have an average particle size of 0.1 to 0.5 mm.

7. The machine tool of claim 1, wherein said abrasive particles are provided at least on one of said tooth tips and said gullets.

8. The machine tool of claim 1, wherein said saw blade comprises side faces, and wherein said abrasive particles are at least partially arranged on said side faces.

9. The machine tool of claim 1, wherein said teeth have a shape selected from the group consisting of rectangular teeth, trapezoidal teeth, negative trapezoidal teeth, M-shaped teeth, rectangular teeth without a base radius, round teeth, angled teeth, and flat teeth.

10. The machine tool of claim 1, having a coated region coated with said metal coating and an uncoated region without any metal coating, said saw blade within said coated region having a thickness of 1 to 2.5 millimeters, said saw blade within said uncoated region having a thickness of 0.4 to 1 millimeters.

* * * * *